United States Patent
Hitron et al.

(10) Patent No.: US 10,817,376 B2
(45) Date of Patent: Oct. 27, 2020

(54) RAID WITH HETEROGENEOUS COMBINATIONS OF SEGMENTS

(71) Applicant: THE SILK TECHNOLOGIES ILC LTD, Yokne'am Ilit (IL)

(72) Inventors: Gilad Hitron, Haifa (IL); Eyal Gordon, Haifa (IL)

(73) Assignee: THE SILK TECHNOLOGIES ILC LTD, Yokne'am Ilit (IL)

( * ) Notice: Subject to any disclaimer, the term of this patent is extended or adjusted under 35 U.S.C. 154(b) by 0 days.

(21) Appl. No.: 16/026,251

(22) Filed: Jul. 3, 2018

(65) Prior Publication Data
US 2019/0012236 A1  Jan. 10, 2019

Related U.S. Application Data

(60) Provisional application No. 62/528,636, filed on Jul. 5, 2017, provisional application No. 62/542,464, filed on Aug. 8, 2017.

(51) Int. Cl.
| | |
|---|---|
| *G06F 12/00* | (2006.01) |
| *G06F 13/00* | (2006.01) |
| *G06F 11/10* | (2006.01) |
| *G06F 3/06* | (2006.01) |
| *G06F 13/28* | (2006.01) |

(52) U.S. Cl.
CPC .......... *G06F 11/1092* (2013.01); *G06F 3/061* (2013.01); *G06F 3/0619* (2013.01); *G06F 3/0631* (2013.01); *G06F 3/0644* (2013.01); *G06F 3/0683* (2013.01); *G06F 11/1076* (2013.01); *G06F 11/1096* (2013.01)

(58) Field of Classification Search
CPC ............. G06F 11/1092; G06F 11/1096; G06F 3/0644; G06F 3/0683; G06F 3/0619; G06F 3/061; G06F 3/0631; G06F 11/1076
See application file for complete search history.

(56) References Cited

U.S. PATENT DOCUMENTS

| | | | |
|---|---|---|---|
| 6,151,685 A * | 11/2000 | Li | ........................ G06F 11/1435 711/114 |
| 2006/0085593 A1 | 4/2006 | Lubbers et al. | |
| 2012/0011396 A1 | 1/2012 | Kitamura et al. | |
| 2015/0254008 A1 * | 9/2015 | Tal | ........................ G06F 3/0619 711/114 |
| 2016/0342360 A1 | 11/2016 | Tal et al. | |

* cited by examiner

*Primary Examiner* — Mark A Giardino, Jr.
(74) *Attorney, Agent, or Firm* — Wiggin and Dana LLP; Gregory S. Rosenblatt; Thomas M. Landman

(57) ABSTRACT

The presently disclosed subject matter includes various inventive aspects, which are directed to protecting data stored in a data storage system using a RAID protection scheme, which enables, responsive to a storage device failure, to execute a rebuild process that uses a total number of storage devices which is greater than the number of segments in a RAID stripe.

27 Claims, 8 Drawing Sheets

RAID WITH HETEROGENEOUS COMBINATIONS OF SEGMENTS

FIELD OF THE PRESENTLY DISCLOSED SUBJECT MATTER

The presently disclosed subject matter relates to data storage systems, and more particularly to data storage systems implementing RAID storage technology.

BACKGROUND

RAID (Redundant Array of Independent Disks) is a storage technology that combines a set of storage devices into a single logical storage unit for the purpose of providing improved storage fault tolerance and enhanced performance. Data and redundancy information are distributed over a group of storage devices to allow RAID rebuild. RAID rebuild is a process which occurs in response to failure of a disk in a RAID group. In this process the failed disk is replaced, and the lost data is reconstructed based on parity segments and/or other data segments in the RAID group.

Distribution of data and redundancy information across RAID group storage devices is carried out by one of several protection schemes also known as "RAID levels". A preferred RAID level is selected depending on the required redundancy, performance, and space utilization. Under some common RAID schemes, each storage device is partitioned into equal size segments. A set of segments which span some or all of the storage devices (but no more than a segment per storage device) constitute a "RAID stripe". Depending on the specific RAID level which is implemented, each such stripe consists of one or more data segments, and a given number of parity segments (otherwise known as "syndromes").

As an example, level 6 RAID enables avoiding data loss in the event of up to two concurrent storage device failures. RAID 6 is implemented by computing two syndrome segments (typically referred to as p and q) for N data segments in each RAID stripe. The first syndrome segment (p) is commonly computed by a XOR operation on the data segments across the stripes. The second syndrome segment (q), requires more complicated computation based on field theory.

GENERAL DESCRIPTION

According to one aspect of the presently disclosed subject matter there is provided a computer implemented method of data protection in a storage system using RAID, the method comprising:

allocating N storage devices constituting a RAID pool; each storage device is dedicated for storing a plurality of segments, where a sequence of segments spanning across all N storage devices constitute a RAID row, each RAID row comprises M RAID stripes, where M>1; responsive to a need to write data in the storage system, using at least one processor for:

generating one or more RAID rows, and for each RAID row:

generating M RAID stripes, each RAID stripe comprising at least K segments, where K*M≤N, the at least K segments including a plurality of data segments and at least one parity segment;

allocating each one of the K*M segments of the M RAID stripes to a respective storage device from among the N storage devices in the RAID pool, such that segments from different RAID stripes are mixed across the RAID row; and writing the K*M segments of the M RAID stripes to the respective storage devices as a single RAID row;

wherein mixing of segments varies in different RAID rows, such that when data of two or more RAID rows is written, different combinations of segments from different stripes are written to different storage devices.

In addition to the above features, the method according to this aspect of the presently disclosed subject matter can optionally comprise one or more of features (i) to (xii) below, in any technically possible combination or permutation.

i. The computer implemented method further comprising implementing a randomized distribution scheme for randomly distributing the at least K segments of the M RAID stripes to a respective storage device from among the N storage devices.

ii. The computer implemented method further comprising: responsive to a storage device failure, using at least one processor for executing a rebuild process comprising:

for each segment in a failed storage device:

reading data from a plurality of other storage devices storing other segments from a common stripe; wherein the total number of the plurality of other storage devices is greater than the number of segments in the common stripe.

iii. The computer implemented method further comprising reconstructing each segment based on the read data.

iv. The computer implemented method further comprising:

identifying the plurality of other storage devices storing other segments from the common stripe, based on a RAID distribution table used for mapping segments to respective storage devices.

v. The computer implemented method further comprising, responsive to a need to write data to one or more RAID rows, for each row: dividing the data into M data groups, dividing each data group to segments and generating a respective RAID stripe from each data group.

vi. The computer implemented method, wherein each RAID stripe comprises more than one parity segment.

vii. The computer implemented method, wherein the N storage devices are distributed in subgroups, each subgroup enclosed in an individual enclosure.

viii. The computer implemented method, wherein the K segments include at least one parity segment calculated using all data segments in the RAID stripe.

ix. The computer implemented method, where different stripes in the same RAID row comprise a different number of segments.

x. The computer implemented method further comprising: responsive to detection of a failed storage device, using at least one processor for executing a rebuild process comprising:

for each segment in the failed storage device:

reading data from a plurality of other storage devices storing other segments from a common stripe;

reconstructing the segment based on the read data;

identifying a different stripe in the same RAID row which comprises a number of valid parity segments that is greater than the number of valid parity segments in the common stripe; and writing the reconstructed data to a parity segment in the different stripe.

xi. The computer implemented method, wherein the different stripe in the same RAID row is one that comprises a greatest number of valid parity segments of all stripes in the RAID row.

xii. The computer implemented method, wherein the data protection in the storage system is capable of handling up to R×M non-concurrent storage device failures in a single stripe without data loss, where R is the number of parity segments in each stripe.

According to another aspect of the presently disclosed subject matter there is provided a distributed data-storage system comprising:

an interface layer comprising at least one control unit, the at least one control unit comprises a processing circuitry and is operatively connected to a plurality of storage devices constituting a physical storage space; the interface layer is configured to allocate N storage devices constituting a RAID pool; each storage device in the RAID pool is dedicated for storing a plurality of segments, where a sequence of segments spanning across all N storage devices constitute a RAID row, each RAID row comprises M RAID stripes, where M>1;

the at least one control unit is configured, responsive to a need to write data in the storage system, to:

generate one or more RAID rows, and for each RAID row to:

generate M RAID stripes, each RAID stripe comprising at least K segments, where K*M≤N, the at least K segments including a plurality of data segments and at least one parity segment;

allocate each one of the K*M segments of the M RAID stripes to a respective storage device from among the N storage devices in the RAID pool, such that segments from different RAID stripes are mixed across the at least one RAID row; and write the K*M segments of the M RAID stripes to the respective storage devices as a single RAID row;

wherein mixing of segments varies in different RAID rows; such that when data of two or more RAID rows is written, different combinations of segments from different stripes are written to different storage devices.

According to another aspect of the presently disclosed subject matter there is provided a non-transitory computer readable storage medium tangibly embodying a program of instructions that, when executed by a computer, cause the computer to execute a method of allocating N storage devices constituting a RAID pool; each storage device is dedicated for storing a plurality of segments, where a sequence of segments spanning across all N storage devices constitute a RAID row, each RAID row comprises M RAID stripes, where M>1; responsive to a need to write data in the storage system:

generating one or more RAID rows; for each RAID row:

generating M RAID stripes, each RAID stripe comprising at least K segments, where K*M≤N, the at least K segments including a plurality of data segments and at least one parity segment;

allocating each one of the K*M segments of the M RAID stripes to a respective storage device from among the N storage devices in the RAID pool, such that segments from different RAID stripes are mixed across the RAID row; and writing the K*M segments of the M RAID stripes to the respective storage devices as a single RAID row; wherein mixing of segments varies in different RAID rows, such that when data of two or more RAID rows is written, different combinations of segments from different stripes are written to different storage devices.

According to another aspect of the presently disclosed subject matter there is provided a control unit configured to operate as part of an interface layer in a data storage system and comprises a processing circuitry being operatively connected to a plurality of storage devices in the data storage system constituting a physical storage space; the control unit is configured to allocate N storage devices constituting a RAID pool; each storage device is dedicated for storing a plurality of segments, where a sequence of segments spanning across all N storage devices constitute a RAID row, each RAID row comprises M RAID stripes, where M>1;

the control unit is configured, responsive to a need to write data in the storage system, to:

generate one or more RAID rows, and for each RAID row to:

generate M RAID stripes, each RAID stripe comprising at least K segments, where K*M≤N, the at least K segments including a plurality of data segments and at least one parity segment;

allocate each one of the K*M segments of the M RAID stripes to a respective storage device from among the N storage devices in the RAID pool, such that segments from different RAID stripes are mixed across the RAID row, and write the K*M segments of the M RAID stripes to the respective storage devices as a single RAID row; wherein mixing of segments varies in different RAID rows, such that when data of two or more RAID rows is written, different combinations of segments from different stripes are written to different storage devices.

The control unit, the data-storage system, and the non-transitory computer readable storage medium disclosed herein according to various aspects, can optionally further comprise one or more of features (i) to (xii) listed above, mutatis mutandis, in any technically possible combination or permutation.

According to another aspect of the presently disclosed subject matter there is provided a computer implemented method of data protection in a storage system using RAID; the method comprising:

allocating N storage devices constituting a RAID pool; each storage device is dedicated for storing a plurality of segments, where a sequence of segments spanning across all N storage devices constitute a RAID row, each RAID row comprises M RAID stripes, where M>1; responsive to a need to write data in the storage system, using at least one processor for:

generating one or more RAID rows, for each RAID row:

generating M RAID stripes, each RAID stripe comprising at least K segments, where K*M≤N, the at least K segments including a plurality of data segments and at least one parity segment;

responsive to a storage device failure, executing a rebuild process comprising:

for each segment in a failed storage device:

reading data from a plurality of other storage devices storing other segments from a common stripe; reconstructing the segment based on the read data; identifying a different stripe in the same RAID row which comprises a greater number of valid parity segments than the number of valid parity segments in the common stripe; and writing the reconstructed data to a parity segment in the different stripe.

In addition to the above features, the method according to this aspect of the presently disclosed subject matter can optionally comprise one or more of features (i) to (v) below, in any technically possible combination or permutation.

i) The computer implemented method, wherein the identifying comprises identifying a different stripe in the same RAID row which comprises the greatest number of valid parity segments of all stripes in the RAID row.

ii) The computer implemented method further comprising writing the reconstructed data to a parity segment in the common stripe, if the storage device failure is the first storage device failure in the common stripe.

iii) The computer implemented method, wherein the data protection in the storage system is capable of handling up to R×M non-concurrent storage device failures in a single stripe without data loss, where R is the number of parity segments in each stripe.

iv) The computer implemented method further comprising updating a RAID distribution table following each rebuild to indicate in which stripe the reconstructed segments are stored.

v) The computer implemented method further comprising responsive to a need to write data in the storage system:

allocating each one of the K*M segments of the M RAID stripes to a respective storage device from among the N storage devices in the RAID pool, such that segments from different RAID stripes are mixed across the RAID row; and writing the K*M segments of the M RAID stripes to the respective storage devices as a single RAID row; wherein mixing of segments varies in different RAID rows, such that when data of two or more RAID rows is written, different combinations of segments from different stripes are written to different storage devices; and wherein during the writing responsive to a storage device failure the total number of the plurality of other storage devices is greater than the number of segments in the common stripe.

According to another aspect of the presently disclosed subject matter there is provided a data-storage system comprising:

an interface layer comprising at least one control unit comprising a processing circuitry and being operatively connected to a plurality of storage devices constituting a physical storage space; the interface layer is configured to allocate N storage devices constituting a RAID pool; each storage device is dedicated for storing a plurality of segments, where a sequence of segments spanning across all N storage devices constitute a RAID row, each RAID row comprises M RAID stripes, where M>1;

the at least one control unit is configured, responsive to a need to write data in the storage system, to:

generate one or more RAID rows, for each RAID row:

generate M RAID stripes, each RAID stripe comprising at least K segments, where K*M≤N, the at least K segments including a plurality of data segments and at least one parity segment;

responsive to a storage device failure, execute a rebuild process comprising:

for each segment in a failed storage device:

read data from a plurality of other storage devices storing other segments from a common stripe;

reconstruct the segment based on the read data;

identify a different stripe in the same RAID row which comprises a greater number of valid parity segments than the number of valid parity segments in the common stripe; and write the reconstructed data to a parity segment in the different stripe.

According to another aspect of the presently disclosed subject matter there is provided a non-transitory computer readable storage medium tangibly embodying a program of instructions that, when executed by a computer, cause the computer to execute a method of data protection in a storage system using RAID; the method comprising:

allocating N storage devices constituting a RAID pool; each storage device is dedicated for storing a plurality of segments, where a sequence of segments spanning across all N storage devices constitute a RAID row, each RAID row comprises M RAID stripes, where M>1;

responsive to a need to write data in the storage system, using at least one processor for:

generating one or more RAID rows, for each RAID row:

generating M RAID stripes, each RAID stripe comprising at least K segments, where K*M≤N, the at least K segments including a plurality of data segments and at least one parity segment;

responsive to a storage device failure, executing a rebuild process comprising:

for each segment in a failed storage device:

reading data from a plurality of other storage devices storing other segments from a common stripe; reconstructing the segment based on the read data;

identifying a different stripe in the same RAID row which comprises a greater number of valid parity segments than the number of valid parity segments in the common stripe; writing the reconstructed data to a parity segment in the different stripe;

reading data from a plurality of other storage devices storing other segments from a common stripe; reconstructing the segment based on the read data; identifying a different stripe in the same RAID row which comprises a greater number of valid parity segments than the number of valid parity segments in the common stripe; and writing the reconstructed data to a parity segment in the different stripe.

According to another aspect of the presently disclosed subject matter there is provided a control unit configured to operate as part of an interface layer in a data storage system and comprising a processing circuitry being operatively connected to a plurality of storage devices in the data storage system constituting a physical storage space; the control unit is configured to allocate N storage devices constituting a RAID pool; each storage device is dedicated for storing a plurality of segments, where a sequence of segments spanning across all N storage devices constitute a RAID row, each RAID row comprises M RAID stripes, where M>1; the control unit is configured, responsive to a need to write data in the storage system, to:

generate one or more RAID rows, for each RAID row:

generate M RAID stripes, each RAID stripe comprising at least K segments, where K*M≤N, the at least K segments including a plurality of data segments and at least one parity segment;

responsive to a storage device failure, execute a rebuild process comprising:

for each segment in a failed storage device:

read data from a plurality of other storage devices storing other segments from a common stripe;

reconstruct the segment based on the read data;

identify a different stripe in the same RAID row which comprises a greater number of valid parity segments than the number of valid parity segments in the common stripe; and write the reconstructed data to a parity segment in the different stripe.

The control unit, the data-storage system, and the non-transitory computer readable storage medium disclosed herein according to various aspects, can optionally further comprise one or more of features (i) to (v) listed above, mutatis mutandis, in any technically possible combination or permutation.

BRIEF DESCRIPTION OF THE DRAWINGS

In order to understand the presently disclosed subject matter and to see how it may be carried out in practice, the subject matter will now be described, by way of non-limiting examples only, with reference to the accompanying drawings, in which.

DETAILED DESCRIPTION

Figure 1:
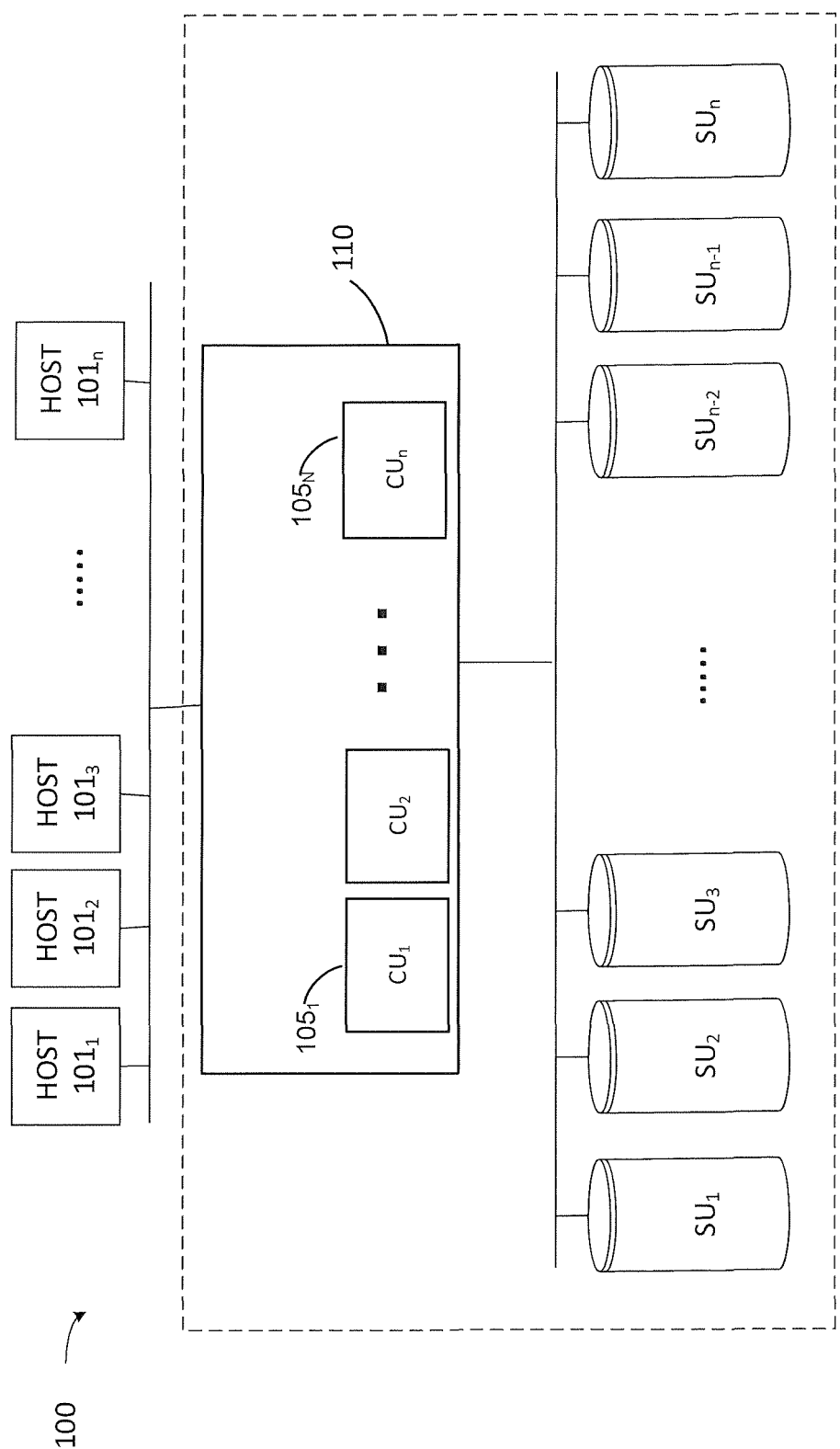
FIG. 1 is a schematic block-diagram illustration of a computer storage system according to some examples of the presently disclosed subject matter.

It will be appreciated that for simplicity and clarity of illustration, elements shown in the figures have not necessarily been drawn to scale. For example, the dimensions of some of the elements may be exaggerated relative to other elements, for clarity. Further, where considered appropriate, reference numerals may be repeated among the figures to indicate corresponding or analogous elements.

Unless specifically stated otherwise, as apparent from the following discussions, it is appreciated that throughout the specification discussions utilizing terms such as "allocating", "generating", "reading", "distributing", "writing", or the like, include actions and/or processes of a computer that manipulate and/or transform data into other data, said data represented as physical quantities, e.g. such as electronic quantities, and/or said data representing the physical objects.

The terms "computer", "computer device", "control unit", "server" or the like as disclosed herein should be broadly construed to include any kind of electronic device with data processing circuitry, which includes a at least one computer processor configured and operable to execute computer instructions stored, for example, on a computer memory being operatively connected thereto. Examples of such a device include: digital signal processor (DSP), a microcontroller, a field programmable gate array (FPGA), an application specific integrated circuit (ASIC), a laptop computer, a personal computer, a smartphone, etc.

As used herein, the phrase "for example," "such as", "for instance" and variants thereof describe non-limiting embodiments of the presently disclosed subject matter. Reference in the specification to "one case", "some cases", "other cases" or variants thereof means that a particular feature, structure or characteristic described in connection with the embodiment(s) is included in at least one embodiment of the presently disclosed subject matter. Thus the appearance of the phrase "one case", "some cases", "other cases" or variants thereof does not necessarily refer to the same embodiment(s).

It is appreciated that certain features of the presently disclosed subject matter, which are, for clarity, described in the context of separate embodiments, may also be provided in combination in a single embodiment. Conversely, various features of the presently disclosed subject matter, which are, for brevity, described in the context of a single embodiment, may also be provided separately or in any suitable subcombination.

Figure 4:
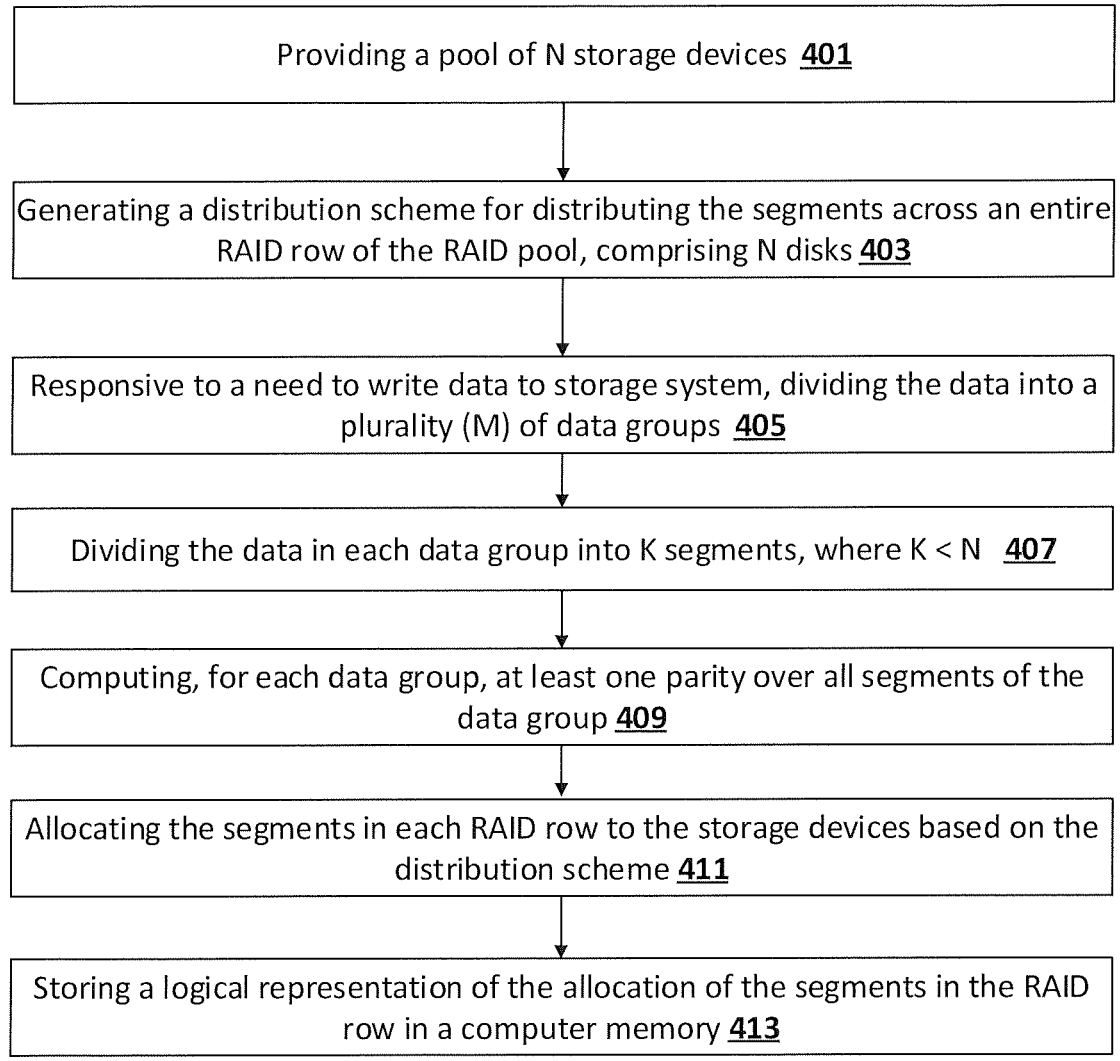
FIG. 4 is a flowchart showing a sequence of operations performed in a storage system, according to some examples of the presently disclosed subject matter.
Figure 5:
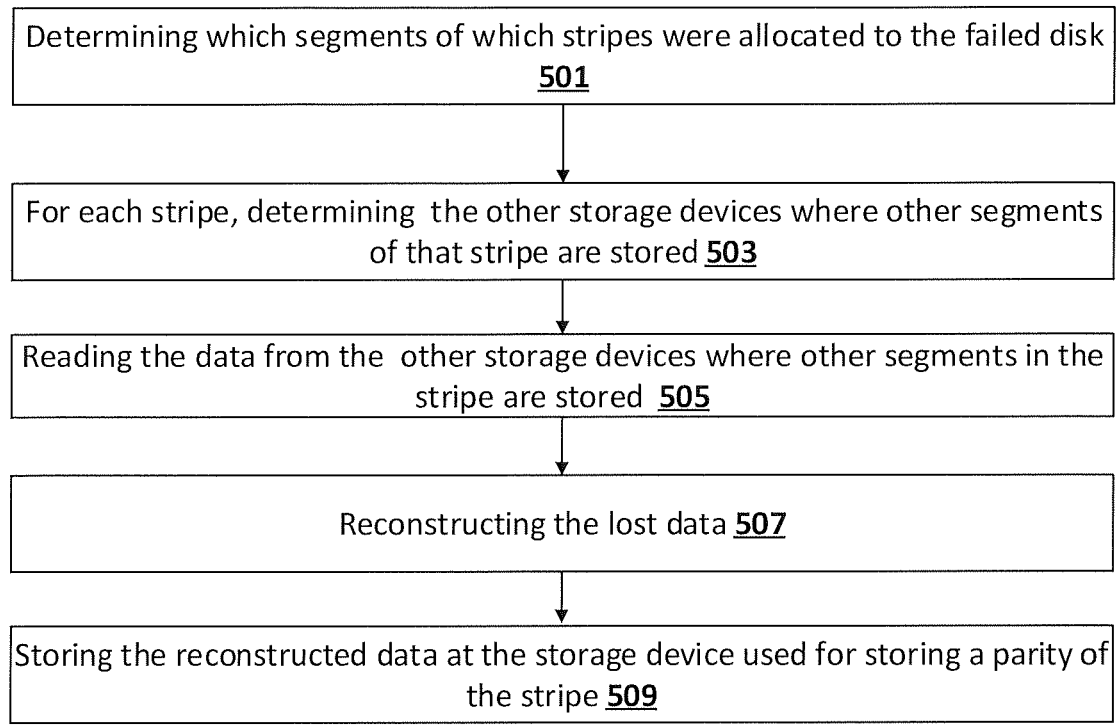
FIG. 5 is a flowchart showing a sequence of operations performed during rebuild in a storage system, according to some examples of the presently disclosed subject matter.

In embodiments of the presently disclosed subject matter, fewer, more and/or different stages than those shown in FIGS. 4 and 5 may be executed. In embodiments of the presently disclosed subject matter, one or more stages illustrated in FIGS. 4 and 5 may be executed in a different order and/or one or more groups of stages may be executed simultaneously. For example, the operation described with reference to block 403 in FIG. 4 can be executed after or together with operations described with reference to blocks 405 to 409.

Figure 2:
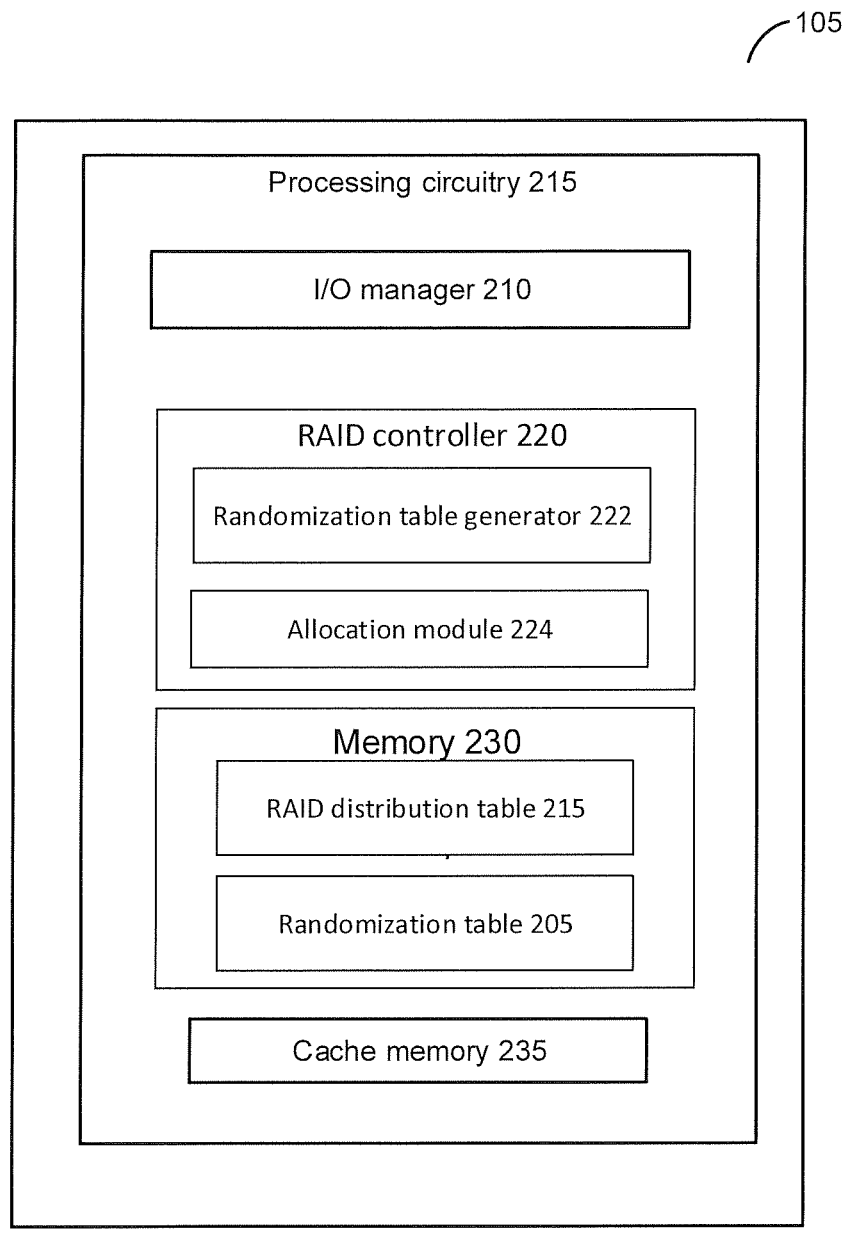
FIG. 2 is a schematic block-diagram illustration of a control unit according to some examples of the presently disclosed subject matter.

FIG. 1 to FIG. 2 illustrate various aspects of the system architecture in accordance with some non-limiting examples of the presently disclosed subject matter. Elements in FIG. 1 to FIG. 2 can be made up of a combination of software and hardware and/or firmware that performs the functions as defined and explained herein. Elements in FIG. 1 and FIG. 2 may be centralized in one location or dispersed over more than one location. FIG. 1 and FIG. 2 are mere examples provided as an illustrative aid in order to better explain the disclosed subject matter. It should be understood that various design variations which may be applied to the figures and provide the functionally as disclosed herein are contemplated within the scope of the presently disclosed subject matter. In other examples of the presently disclosed subject matter, the system may comprise fewer, more, and/or different elements than those shown in FIG. 1 and FIG. 2. For example, some components of control unit 105 can be implemented as a separate unit in interface layer 110 or implemented on an external server or be otherwise operatively connected to the storage system. In another example, memory 230, which is illustrated as a unit separated from Raid controller 220 can be otherwise be made as integral part of the controller.

Bearing the above in mind, attention is drawn to FIG. 1, which is a schematic block-diagram of a computer storage system, according to some examples of the presently disclosed subject matter. Storage system 100 includes a physical storage space comprising one or more physical storage units ($SU_{1-n}$) also known as enclosures, each physical storage unit comprising one or more storage devices. Storage devices (referred to herein below also as "disks") may be any one of Hard Storage devices (HDD) or Solid State Drives (SSD, comprising for example, a plurality of NAND elements), DRAM, non-volatile RAM, or any other computer storage device or combination thereof. Physical storage units ($SU_{1-n}$) can be consolidated in a single unit, or can be otherwise distributed over one or more computer nodes connected by a computer network.

Storage system 100 can further comprise an interface layer 110 comprising various control units (CU $105_{1-n}$) operatively connected to the physical storage space and to one or more hosts ($101_{1-n}$), and configured to control and execute various operations in the storage system. For example, control units $105_{1-n}$ can be adapted to read data and/or metadata from the storage ($SU_{1-n}$), and/or write data and/or metadata to the storage ($SU_{1-n}$). Various other examples of operations performed by the control units are described in more detail below. Control units $105_{1-n}$ can be adapted to execute operations responsive to commands received from hosts $101_{1-n}$. A host includes any computer device which communicates with interface layer 110 e.g. a PC computer, working station, a Smartphone, cloud host (where at least part of the processing is executed by remote computing services accessible via the cloud), or the like.

According to some examples, the presently disclosed subject matter contemplates a distributed storage system with an interface layer 110 configured with multiple interconnected control units $105_{1-n}$. As would be apparent to any person skilled in the art, unless stated otherwise, principles described herein with respect to a single control unit can be likewise applied to two or more control units in system 100.

According to some examples, different control units $105_{1-n}$ in the interface layer 110 (where a control unit is implemented, in some examples, by a dedicated computer device, e.g., a dedicated computer server device) can be assigned for managing and executing operations related to a certain area within the physical storage space (e.g. an area comprising, for example, one or more designated physical storage units or part thereof). In some examples, there are at least two control units that are each assigned to control operations (e.g. handle I/O requests) at respective non-overlapping storage areas, such that one control unit cannot access the storage area assigned to the other control unit, and vice versa.

By way of example, control units can hold translation tables or implement translation functions which map logical addresses to the respective physical storage space in order to assign a read or write command to the one or more control units responsible for it. In response to receiving an I/O request, the control unit that received the request can be configured to determine with which address (defined for example by a logical unit and logical block address—LU, LBA) the I/O request is associated. The control unit can use the address mapping tables (or mapping functions) to determine, based on the logical address referenced in the I/O request, to which storage location in the physical storage to address the I/O request, and which control unit is responsible for processing this request.

In some examples (e.g. for the purpose of redundancy and/or efficiency) two or more control units can be assigned to handle I/O requests addressing the same physical storage area. According to this approach, communication between different components in computer system 100 can be realized over a network (e.g. Ethernet) where different control units communicate for the purpose of synchronizing execution of operations e.g. in order to increase efficiency and reduce processing time. In some examples, two control units are each assigned to control operations at non-overlapping storage areas and also at a different overlapping storage area.

Communication between hosts ($101_{1-n}$) and interface layer 110, between interface layer 110 and storage units ($SU_{1-n}$) and within interface layer 110 (e.g., between different control unit $105_{1-n}$) can be realized by any suitable infrastructure and protocol. Hosts ($101_{1-n}$) can be connected to the interface layer 110 directly or through a network (e.g. over the Internet). According to one example, communication between various elements of storage system 100 is implemented with a combination of Fiber Channel (e.g. between hosts and interface layer 110), SCSI (e.g. between interface 110 and storage units) and InfiniBand (e.g. interconnecting different control units in interface 110) communication protocols. According to other examples, communication between various elements of storage system 100 is implemented while making use of Non-Volatile Memory Express (NVMe), also known as Non-Volatile Memory Host Controller Interface Specification (NVMHCIS) or NVMe over Fabric.

FIG. 2 is a schematic block-diagram showing some components of a control unit according to some examples of the presently disclosed subject matter. It is noted that FIG. 2 is provided for illustrative purposes only and should not be construed as limiting; in reality a control unit includes additional elements and/or different design.

Control unit 105 can be implemented on a computer device comprising a processing circuitry 250. The processing circuitry 250 is configured to provide processing capability necessary for the control unit to function as further detailed below with reference to FIGS. 4 and 5. Processing circuitry 250 comprises or is otherwise operatively connected to one or more computer processors (not shown separately) and memory. According to some examples, the processor(s) of processing circuitry 250 can be configured to execute one or more functional modules in accordance with computer-readable instructions implemented on a non-transitory computer-readable memory of the processing circuitry. Such functional module(s) are referred to hereinafter as comprised in the processing circuitry.

Processing circuitry 250 can comprise, by way of example, an I/O manager 210 configured to handle I/O requests, received for example from host computers $101_{1-n}$. I/O manager 210 can comprise or be otherwise operatively connected to a data-storage unit (comprising computer storage as detailed above) configured to store data and/or metadata, configurations and/or logic which are used by I/O manager 210.

According to some examples, processing circuitry 250 of control unit 105 can further comprise RAID controller 220. RAID controller 220 is configured to manage a RAID protection scheme, including, inter alia, distribution of data into data segments, syndrome segments calculation, distribution of data segments and syndrome segments over the storage devices, rebuild operations, etc. More details of operations executed by RAID controller 220 according to some examples of the presently disclosed subject matter are described below with reference to FIGS. 4 and 5.

According to further examples, processing circuitry 250 of control unit 105 can further comprise, or be otherwise operatively connected to, memory 230 and cache memory 235 (including transitory and non-transitory computer data storage). Memory 230 can be utilized for storing information needed for mapping between the physical storage space and the respective logical representation as mentioned above. Memory 230 can be utilized for example for storing RAID distribution tables logically representing distribution of data and syndrome segments to storage devices. Cache memory 235 can be utilized for example, by I/O manager 210 during execution of write and read commands and by RAID controller 220 during syndrome segments computation and RAID stripe generation.

In general, different RAID protection schemes can be differentiated based on their resiliency and performance. The term "resiliency" refers to the ability to withstand disk failure i.e. how many disk failures can be tolerated without data loss, and the term "performance" refers to rebuild time, where shorter rebuild time provides better performance. As disk storage space increases, rebuild time, following one or more disk failures in RAID supported storage systems, becomes a greater concern.

According to the presently disclosed subject matter, a new RAID scheme is presented, which allows to shorten rebuild time and thus improve performance of a RAID build process. This is done by increasing the number of storage devices which participate (share the read and write workload) in a RAID rebuild.

A group of storage devices, which participate in the presently disclosed RAID protection scheme is referred to herein as a "pool of storage devices" or "RAID pool". According to the proposed RAID scheme, for N storage devices (e.g. SSDs) constituting a pool of storage devices, there exists a partitioning of each storage device into segments, where a sequence of segments spanning across all N storage devices constitutes a RAID row. Within each row of segments, M RAID stripes are generated, each stripe comprising at least K storage segments, where M>1 and K<N. Every (at least) K RAID segment of a certain RAID stripe in a RAID row includes R storage segments assigned for storing parity values calculated for that storage stripe, and the rest of the storage segments (K−R) are assigned for storing data segments. All segments in each row (from all M stripes) are distributed over the N storage devices in the entire pool of storage devices, such that segments from different stripes are mixed over each RAID row.

As further explained below, according to the presently disclosed subject matter, the number of storage devices that participate in a rebuild is greater than the total number of segments in a RAID stripe. Notably, in some cases, essentially all (N) storage devices in the pool can be used during a rebuild of a failed storage device. This approach enables to improve rebuild performance without increasing the number of segments in each RAID stripe.

To this end, a pool of storage devices comprising N elements (storage devices) is provided. According to some examples, RAID controller 220 can be configured to divide write data into data segments and further divide the data segments into subgroups, each subgroup being used for the implementation of an independent RAID stripe. The segments of each one of the plurality of RAID stripes are allocated to K (or more, e.g. K+1) respective segments in K disks in the RAID pool.

Allocation of data and parity segments is done according to a distribution scheme for distributing data segments and syndrome segments from the plurality of individual RAID stripes across the pool of storage devices, such that segments or groups of segments from different stripes are mixed across the RAID row. The desired result of the distribution scheme is to store heterogeneous combinations of segments in the different storage devices. This result can be achieved by a distributing scheme which implements varying mixing (patterns) of segments in different RAID rows. According to some examples, the distribution scheme allows to mix segments in each RAID row in a manner which is unique compared to other rows in the same RAID pool. In other examples some repetition of mixing patterns between rows can be found.

Figure 3A:
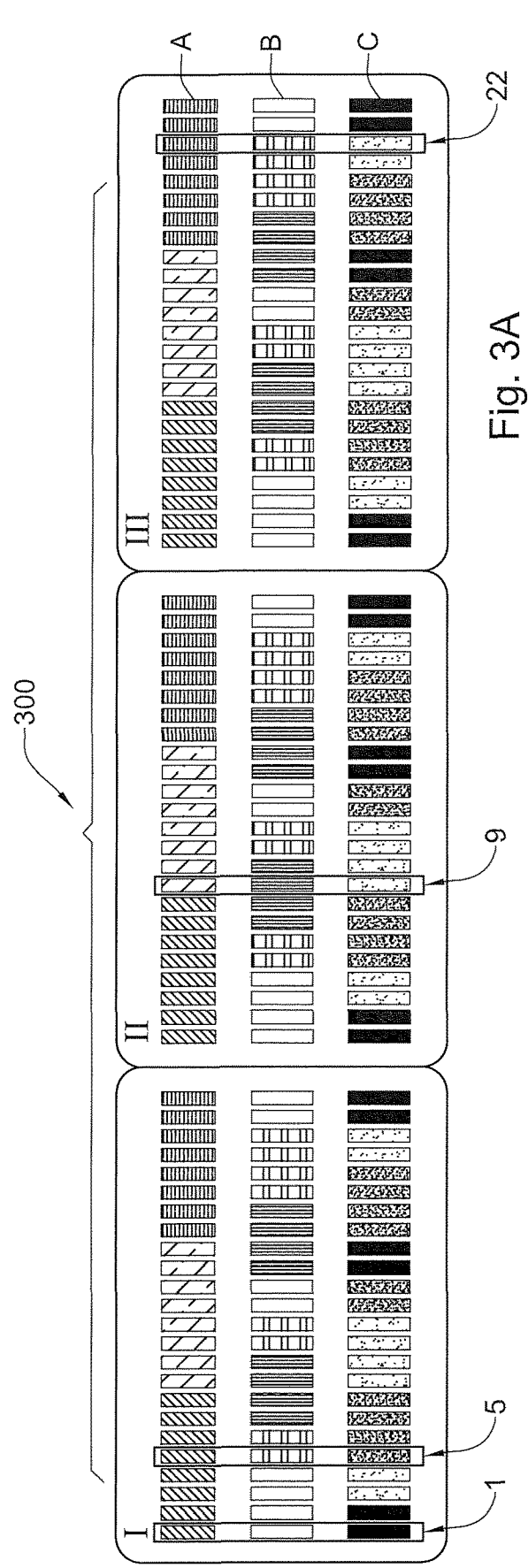
FIG. 3a and FIG. 3b are schematic illustrations of a distributed RAID pool, according to some examples of the presently disclosed subject matter.
Figure 3B:
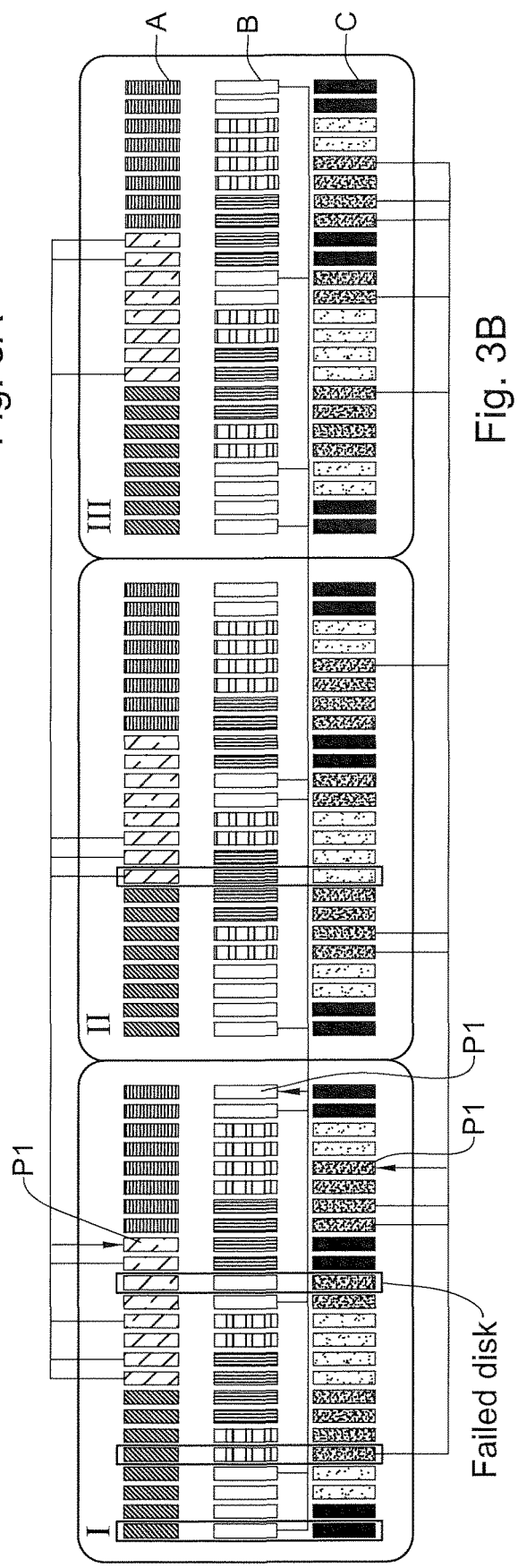

FIG. 3a shows a schematic illustration of RAID distribution across a RAID pool, according to some examples of the presently disclosed subject matter. Notably, FIGS. 3a and 3b are simplified schematic illustrations which are provided for the purpose of better understanding various principles of the presently disclosed subject matter and should not be construed as binding in any way. The example shown in FIG. 3 includes a RAID pool 300 which comprises 3 enclosures, I, II and III, each enclosure comprising 24 storage devices (e.g. SSDs). Each column (comprising 3 cylinders) in each enclosure represents a single storage device (e.g. SSD). The total number of storage devices in RAID pool 300 is: 24*3=72 (where: k=24; M=3; and N=72).

Each storage device is partitioned into a plurality of storage segments. In the illustration, each single cylinder in each storage device represents a storage segment within the storage device accommodated for storing a respective RAID segment. A set of segments which span over all storage devices (but no more than a segment per storage devices) constitute a "RAID row". Thus the entire RAID pool 300 comprises 3 RAID rows, A, B, and C.

Each RAID row comprises 3 RAID stripes, each stripe comprising 24 segments out of the total 72. In the illustration, segments in each one of RAID rows A, B, and C, which are part of the same RAID stripe, are indicated by the same background pattern. Different segments assigned to the same RAID stripe are distributed across the entire RAID row, such that segments from different stripes are mixed together over the entire row. For example, RAID row A comprises 3 stripes, each comprising 24 segments, and shows a mixing pattern where 8 segments of each stripe alternately span across the RAID row, which, according to this example, spans across three different enclosures.

Notably, the pool of storage devices can be located in a single enclosure or in a plurality of enclosures, provided that disks in all the enclosures can be accessed in the same manner. For example, as mentioned above, storage system 100 can be implemented where a plurality of control devices are given full (for executing all operations) or partial (for executing some of the operations) access to a plurality of enclosures, each comprising a plurality of storage devices. In this case, the disks available in the plurality of enclosures can constitute the "pool of storage devices" mentioned earlier. This can be implemented for example by using a network switch for connecting the control units and the enclosures over a network (e.g. Ethernet). This approach, also known as "data-storage fabric" or "over a fabric storage system", exposes all disks in all the connected enclosures to all the connected control units, providing a uniform physical storage space over all disks in the pool. In other examples, a single enclosure (e.g. with N=24) can be divided into M stripes, each comprising a part of the storage devices (e.g. 3 stripes, each spanning 8 disks).

Because the number of disks allocated for storing each RAID stripe is smaller than the total number of disks in the RAID pool and because of the difference in distribution of segments in different RAID rows, distribution of the segments across one row is independent of the distribution of the segments in other RAID rows. Independent distribution of segments in different rows results in varying combinations of segments from different RAID stripes, out of the 3 RAID stripes, in the different storage devices. For example, it can be seen in FIG. 3a that each one of disks 1 and 5 in enclosure I, disk 9 in enclosure II and disk 22 in enclosure III store a different combination of segments originating from different stripes (as indicated by the different background patterns of the segments stored in each disk). This is different than the classical approach, in which each storage device comprises the same combination of segments, i.e. one segment from each stripe in the same RAID group.

Notably, the type of RAID protection scheme which is implemented over each RAID stripe individually (referred to hereinafter as "internal RAID protection scheme") can be selected based on the specific preference and system requirements. According to some examples, the internal RAID protection scheme is selected such that it comprises at least one syndrome that is calculated over the entire data segments in the RAID stripe, for example RAID 6 and RAID TREE.

"RAID TREE" is a RAID protection scheme which comprises three syndrome segments. Unlike RAID 6, where both p syndrome and q syndrome are calculated over all the data segments in a given RAID stripe, in a RAID TREE protection scheme, two individual p syndromes and one q syndrome are computed for each stripe.

Each set of data segments in a given RAID TREE stripe is divided into two subsets. Each subset is protected by a dedicated "type-1" (or p) syndrome segment in the stripe, (implemented for example by a XOR of the data segments, as used in the RAID-4 and RAID-5 schemes).

In addition, the entire set of data segments (the union of both subsets) is protected by a "type-2" (or q) syndrome segment within the stripe. Computationally, "type-2" syndrome can be the same syndrome which is used as the second syndrome in standard RAID 6 protection schemes, in addition to a XOR of the data segments.

The two independent syndromes, which protect each data segment, protect each stripe from data loss when up to two segments are lost due to storage device failure. This property is provided also by a standard RAID 6 protection level. Unlike RAID 6, the RAID TREE scheme provides that, in the event of a single storage device failure, while serving reads from the failed storage device before it has been recovered, only half of the data segments need to be read in order to calculate the lost data.

As mentioned above, following storage device failure, a RAID rebuild process is executed (e.g. by RAID controller 220) during which lost data segments and/or syndrome segments are reconstructed, and a failed disk is rebuilt by overwriting some of the non-failed segments in each stripe. Each reconfigured stripe has one less redundancy segment, while maintaining the property that each data segment is protected by two independent parities. Therefore, the stripe continues to be protected from data loss when up to two (additional) data segments are lost due to storage device failures. The rebuild and reconfiguration of a stripe following a single storage device failure results in a RAID 6 format stripe. As in RAID 6, a single type-1 syndrome segment protects all the data segments of the stripe (no division into two subsets), and a type-2 syndrome continues to protect all the data segments of the stripe.

Following two storage device failures, a rebuild is executed to reconfigure each RAID stripe to a RAID 5 protection scheme, where a single parity protection protects all the data segments of the stripe. Although RAID 5 has one less protection level than the original configuration, it still has a redundancy segment which provides protection. This has a better protection level, than if the stripe had been initially configured as a RAID 6 configuration, which would leave the stripe without any redundancy segments.

Turning to FIG. 4 it shows a flowchart of operations performed according to some examples of the presently disclosed subject matter. Operations described with reference to FIG. 4 (as well as FIGS. 5 and 6 below) can be executed for example, by interface layer 110 and more specifically by one or more control units 105 described above. It should be appreciated, that while some operations are described with reference to the illustrated components and sub-components of system 100 mentioned above, this is done by way of example only, and should not be construed to limit the operations to being implemented on such components alone, as the same operations can be executed using a storage system having alternative system design.

As explained above, a pool of N storage devices is allocated for implementing the RAID scheme (block 401). Each storage device is partitioned into a plurality of segments for storing respective data segments and parity segments, where a set of segments which span all of the storage devices constitute a "RAID row". At block 403, a distribution scheme for distributing segments over the entire RAID pool is generated. According to some examples, the distribution scheme is not generated in real-time as part of the flow e.g. can be received from another source or be stored in computer memory in advance. As explained above, the distribution scheme is directed for increasing variance between combinations of segments from different RAID stripes which are stored in different storage devices in the RAID pool.

According to one example, a distribution scheme can be implemented with the help of a randomization table, where each row in the randomization table comprises a sequence of integers in random order. The sequence of integers in each row logically represents one possible randomized distribution of segments (including both data segments and parity segments) in a respective RAID row. The randomization table comprises N columns, N being the total number of storage devices available in the RAID pool. The number of rows in the randomization table is equal to, or lower than, the actual number of rows in the RAID pool.

By way of example, RAID controller 220 can comprise or be otherwise accessible to randomization table generator 222 configured to generate randomization table 205. Randomization table 205 can be stored in computer memory 230. Randomization table generator 222 can be configured to generate, for each row i in the randomization table a randomly ordered sequence of integers (e.g. using pseudo random function). The integer values in the sequence may run for example, from 1 to N. The integers in the generated sequence can be inserted into respective cells in row i or stored in some other manner.

According to one example, each integer value in the randomized sequence can represent a specific storage device in the RAID pool. Each location in the randomized sequence (or in some examples a respective cell in the randomization table) can represent a specific data segment or syndrome segment in a respective RAID row. Each one of i rows in randomization table 205 represents a possible randomized distribution of segments in a RAID row. Thus, assuming the following randomized sequence of integers for N=12: 10 2 6 7 1 9 4 5 3 11 12 8, the following allocation of segments can be made:

The first segment in the RAID stripe is allocated to storage device 10; the second segment in the RAID stripe is allocated to storage device 2; the third segment in the RAID stripe is allocated to storage device 6; the fourth segment in the RAID stripe is allocated to storage device 7, and so forth.

Given a large enough number of RAID rows in a RAID pool (for example greater than 1000) a random distribution scheme, as disclosed above, ensures sufficient variance in the stripe combination of segments stored in each disk. In other words different disks in the RAID pool comprise combinations of segments originating from different RAID stripes.

According to some examples, responsive to a need to write data (e.g. responsive to one or more write requests received from a host) to the storage system, write data (data to be written) which matches in size data written in a single row, is divided into two or more data groups (block 405). Each data group comprises data assigned to be written in a respective RAID stripe, where each RAID stripe is independently protected by a respective RAID protection scheme. For example, RAID controller 220 can be configured to divide the data into M data groups (M>1), each data group assigned with part of the data to be written in a single RAID stripe. In some cases different data groups may not be of equal size.

The data in each data group is divided into K data segments of a respective RAID stripe, where K<N (block 407). At least one parity segment (R) is calculated for each stripe (block 409), where in some examples R>1. Each RAID stripe comprises K (or more) segments out of which R segments are parity segments and K–R are data segments. The number of segments in each row (and the correspondingly allocated storage devices) therefore equals the number of RAID stripes in each row in the pool, multiplied by the number of segments (columns) in each RAID stripe (K*M).

The presently disclosed subject matter is not limited to a specific protection scheme, provided that the implemented protection scheme comprises at least one syndrome calculated over the entire data segments in the RAID stripe. For example, in case "RAID TREE" protection scheme is implemented, RAID controller 220 can be configured to calculate three syndromes for each stripe independently. To this end, RAID controller 220 can divide the data segments in a RAID stripe into two subsets of data segments. A first, type-1 syndrome is computed for protecting the data segments in the first subset, a second type-1 syndrome is computed for protecting the data segments in the second subset, and a type-2 syndrome is computed for protecting all segments in the RAID stripe. Alternatively, if RAID 6 protection scheme is implemented, RAID controller 220 can be configured to calculate a first parity P and a second parity Q over all data segments in each stripe.

The segments in each RAID row (of all M stripes) are then allocated and written to their respective storage devices based on the distribution scheme (block 411). Notably, it is not necessary that all M*N segments of the same RAID row are written at the same time, and, optionally, segments of each stripe can be written independently.

According to one example, a row can be selected from a randomization table, using some predefined selection method, and the segments in a respective RAID row are allocated to respective storage devices in the pool based on the randomized order of the integers in the selected row. In a reading operation directed to a given stripe, the same randomization used for writing the stripe is used for reconstructing the data.

For example, RAID controller 220 can further comprise or be otherwise operatively connected to allocation module 224 configured to allocate the segments in the RAID row to the respective storage devices in the RAID pool, based on the randomization provided by the selected row in the randomization table. In some examples, RAID controller 220 can be operatively connected to I/O manager configured to execute the actual writing of the data segments and parity segments to the allocated storage devices. In some examples, RAID controller 220 can be implemented as a part of the I/O manager.

According to one example, the row in the randomization table is selected by performing a modulo (%) operation between the RAID row number (e.g. a serial number of the RAID row in the RAID pool) to which the data is being written in the current write operation, and the total number of rows in randomization table 205. The same row selection method is used during read operations in order to reconstruct the data correctly.

Assuming for example, randomization table 205 comprises 1000 rows and the current write operation is directed to RAID row number 3007 in the RAID pool, the row in the randomization table is selected by: 3007% 1000=7. In this case, the randomized sequence of integers which appears in row 7 in randomization table 205 is used by RAID controller 220 for randomly allocating the segments in the RAID row.

In some examples, a logical representation of the distribution of the segments in the RAID row can be stored in the computer memory e.g. for example in a RAID distribution table 215 (block 413). As mentioned above, RAID distribution table 215 serves for mapping between the data segments and syndrome segments in each RAID row and the respective storage devices in the physical storage to which the segments are allocated. RAID controller 220 can be further configured to manage a random distribution table 215 used for logically representing the distribution of data and syndrome segments across storage devices in a RAID pool.

In case of disk failure, a rebuild process is executed. FIG. 5 is a flowchart showing a sequence of operations performed during rebuild in a storage system, according to some examples of the presently disclosed subject matter.

In some examples, in a rebuild process it is determined which segments of which stripes were allocated to the failed disk (block 501). As a result of the independent mixing of segments from a plurality of RAID stripes in different rows of the RAID pool (implemented for example by random distribution), the failed disk comprises a combination of segments originating from different RAID stripes, which is different from at least some of the other combinations of segments stored in other disks.

For each segment in the failed disk, its respective stripe is identified and it is determined which other storage devices in the RAID pool are used for storing other segments of that stripe (block 503). These operations can be performed for example, by RAID controller 220 with the help of RAID distribution table 215, which provides the mapping between disks and RAID stripes segments as explained above.

Some or all of the other segments of the same stripe (a common stripe) of each segment in the failed disk are read, e.g. with the help of I/O manager 210 (block 505). As explained above, according to the presently disclosed subject matter, due to the heterogeneous combination of segments from different RAID stripes which are stored in different disks across the RAID pool, the number of disks which can be used for reading the segments needed for reconstruction of the data in the failed disk, is greater than the number of segments in a stripe, which helps to improve performance during rebuild.

The read data is used for reconstructing the lost segment in the failed disk (block 507). The reconstructed data of each stripe is written (e.g. with the help of I/O manager 210) in place of the parity segment, assuming the parity segment is not the one stored in the failed disk (block 509).

FIG. 3*b* shows a schematic illustration of RAID distribution across a RAID pool including an indication of disks participating in a rebuild, according to some examples of the presently disclosed subject matter. Assuming for example disk 14 in enclosure I has failed, FIG. 3*b* indicates, by connecting lines in each row, which disks are read for the purpose of the reconstruction of the lost segment in that row. As shown by the different background patterns of disks from different stripes, the disks which are read in the reconstruction of the segment in row A, are different than the disks which are read in the reconstruction of the segment in row B, and the disks which are read in the reconstruction of the segment in rows A and row B are different than the disks which are read in the reconstruction of the segment in row C. The illustrated example demonstrates a first failure in a "RAID tree" protection scheme. In this example 30 disks take part in the rebuild process. Notably, 30 is a disk number greater than the 24 disks used for storing segments of a single RAID stripe. Assuming a different scenario where a syndrome is calculated using all 23 disks (e.g. Q parity in RAID 6), up to 69 disks can participate in the read operations.

According to the presently disclosed subject matter it is suggested to use the RAID row configuration described above for increasing the resiliency provided by the RAID protection scheme to the data stored in the storage system. As mentioned above the term "resiliency" refers to the number of disk failures which can be tolerated without data loss.

As explained above, according to the proposed RAID scheme, for N storage devices constituting a pool of storage devices there exists a partitioning of each storage device into segments, where a sequence of segments spanning across all N storage devices constitutes a RAID row. Within each row of segments, multiple RAID stripes are generated. RAID segments of a certain RAID stripe in a RAID row includes R storage segments assigned for storing parity values calculated for that storage stripe, and the rest of the storage segments (K–R) are assigned for storing data segments.

According to some examples of the presently disclosed subject matter, a plurality of failed storage devices from one stripe are reconstructed and the reconstructed data is then written to other storage devices assigned to other stripes in the same RAID row. According to this example, each RAID stripe in each RAID row includes at least two parity segments (R>1).

Figure 6:
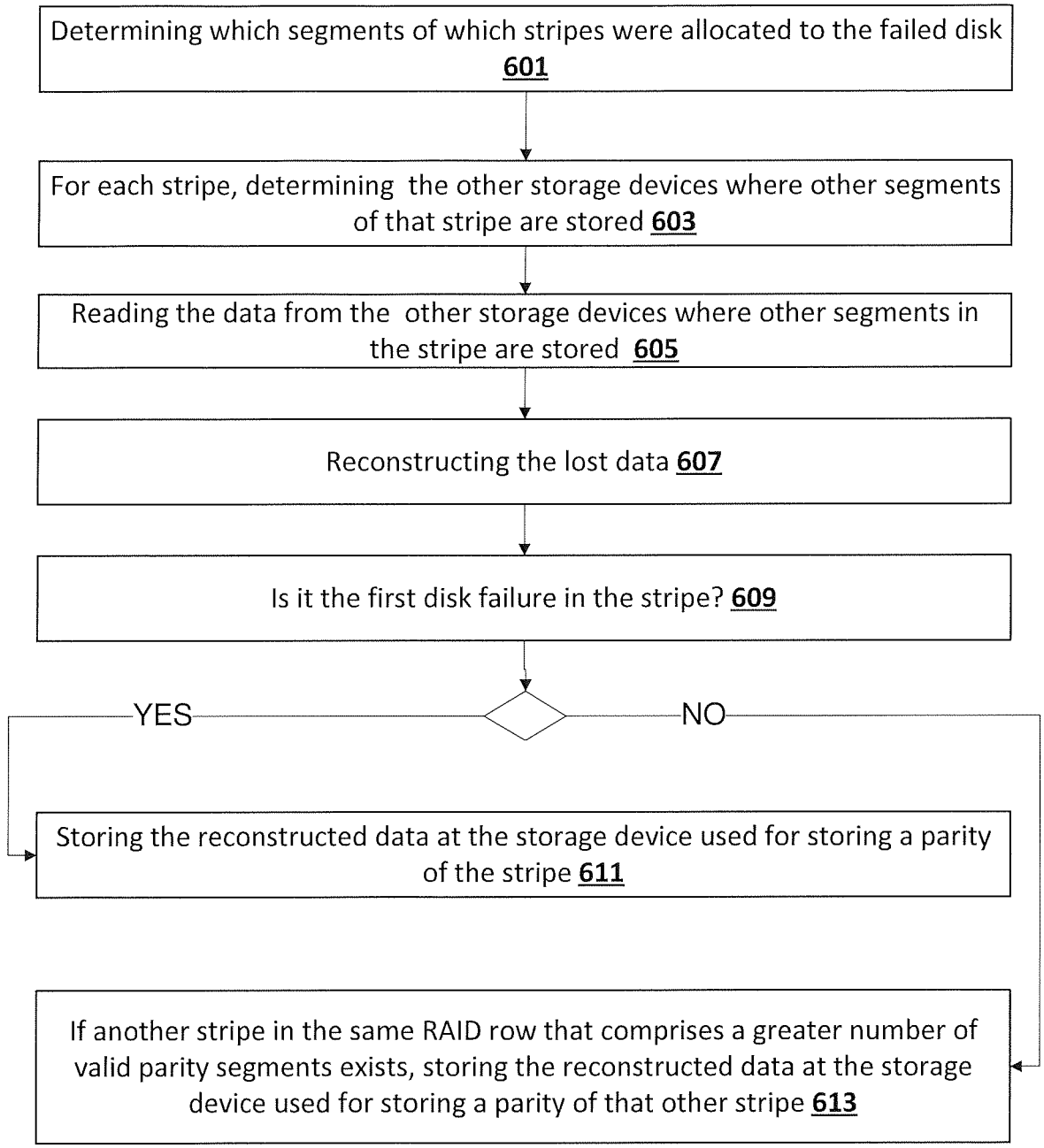
FIG. 6 is a flowchart showing a sequence of operations performed during rebuild in a storage system, according to some examples of the presently disclosed subject matter.

FIG. 6 is a flowchart showing a sequence of operations performed during rebuild in a storage system, according to some examples of the presently disclosed subject matter.

In some examples, in a rebuild process it is determined which segments of which stripes (common stripes) were allocated to the failed disk (block 601). For each segment in a failed disk it is determined which other storage devices in the RAID pool are used for storing other segments from a common stripe (block 603). These operations can be performed for example, by RAID controller 220 with the help of RAID distribution table 215, which provides the mapping between disks and RAID stripes segments as explained above.

In some examples where independent mixing of segments from a plurality of RAID stripes is implemented as explained above, other segments from the common stripes are mixed in different disks. In other examples, where mixing is not implemented, the other segments are ordered sequentially in each stripe.

Some or all (depending for example on the RAID scheme which is used) of the other segments of the same stripe (a common stripe) of each segment in the failed disk are read, e.g. with the help of I/O manager 210 (block 605). The read data is used for reconstructing the lost segment in the failed disk (block 607).

As mentioned above, according to this example, the RAID scheme which is implemented in each stripe makes use of at least two parity segments (e.g. RAID 6 and RAID TREE).

The reconstructed data can be stored at a parity segment of another stripe. According to some examples, for each stripe of each segment in the failed disk, it is determined how many disk failures have already occurred in the stripe, or in other words how many parities have already been used in the stripe (block 609).

In some examples, if the current disk failure is the first disk failure of the stripe, the reconstructed data of a stripe is written (e.g. with the help of I/O manager 210) in place of a parity segment of that same stripe (assuming the parity segment is not the one stored in the failed disk), rendering the parity segment invalid (block 611).

If the current disk failure is not the first disk failure of the stripe, this means that at least one parity segment of the failed stripe has already been over-written. In this case, the reconstructed data of each stripe is written (e.g. with the help of I/O manager 210) in place of a parity segment of another stripe in the same RAID row, which has a greater number of valid parity segments (which have not been used) rendering that parity segment invalid following the write (block 613).

According to some examples, for each segment in the failed disk, it is determined whether there is another stripe in the same RAID row, other than the one containing the segment, that encountered less failures, and thus has a greater number of unused parity segments. If such a stripe is identified, the reconstructed data of the segment is written (e.g. with the help of I/O manager 210) in place of a parity segment of the identified stripe, rendering that parity segment invalid following the write.

According to some examples, for each segment in the failed disk, a different stripe (i.e. different than the common stripe to which the segment is allocated) in the same RAID row that comprises the greatest number of valid parity segments of all stripes in the RAID row, is identified. In case there is more than one stripe in the same RAID row that complies with this criteria, one stripe can be selected, either arbitrarily or based on predefined logic.

In some examples where each stripe is protected by a RAID scheme that includes more than two parities (e.g. RAID TREE), in order to maintain a balanced distribution of failure protection in all stripes of the same RAID row, when multiple consecutive disk failures occur, a parity from each stripe is first used for storing reconstructed segment data. When all stripes have lost one parity, a second parity from each stripe is used for storing reconstructed segment data. This cycle can be repeated until all stripes are left with a single parity segment (providing a RAID 5 protection). Thus, in addition to increasing resiliency, this process also enables to maintain a balanced distribution of failure protection in different stripes of the same RAID row.

FIGS. 7a to 7d show schematic illustrations of a RAID row comprising 5 stripes numbered 1 to 5. For ease of illustration, the five stripes of the same RAID row are drawn one below the other. It is noted that in these particular drawings, each cylinder represents a separate storage device, where all five stripes constitute a RAID row.

Figure 7A:
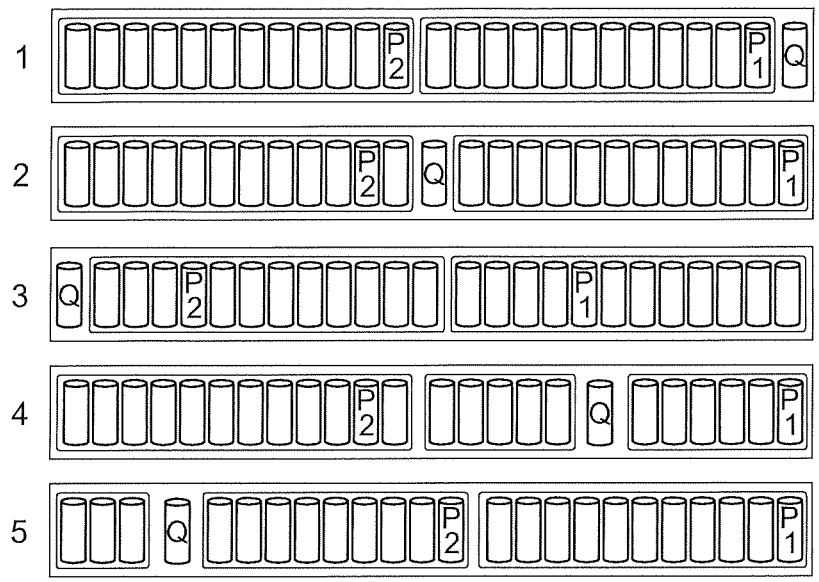
FIG. 7a is a schematic illustration of a RAID row comprising 5 stripes, each protected by a RAID TREE protection scheme, according to some examples of the presently disclosed subject matter.

FIG. 7a is a schematic illustration of a RAID row comprising 5 stripes, each protected by a RAID TREE protection scheme, according to some examples of the presently disclosed subject matter. Each stripe in the RAID row is protected by 3 parity segments in accordance with the RAID TREE paradigm. In each stripe, one part is protected by one parity P1, the other part is protected by a second parity P2, and the entire stripe is protected by a third parity Q.

Figure 7B:
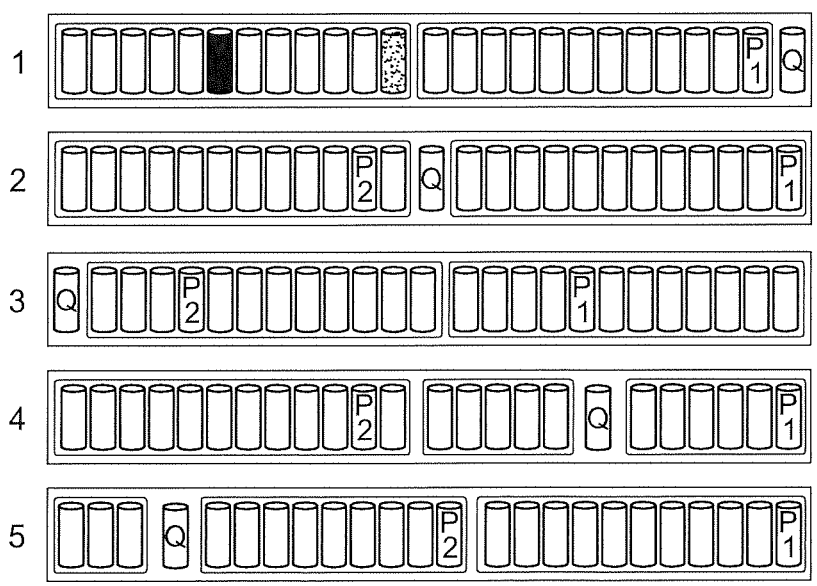
FIG. 7b is a schematic illustration showing the RAID row of FIG. 7a following a first disk failure in the first stripe on the left, according to some examples of the presently disclosed subject matter.

FIG. 7b is a schematic illustration showing the RAID row of FIG. 7a following a first disk failure in stripe 1, according to some examples of the presently disclosed subject matter.

FIG. 7b shows an example where following one disk failure, the lost segment (failed segments are indicated as cylinders with a solid background) from the failed disk is reconstructed and written instead of one parity segment P1 (re-written parity segments are indicated as cylinders with a dotted background) in the same stripe, and the other parity P2 is recalculated over the entire stripe to thereby obtain a RAID 6-like protection.

Figure 7C:
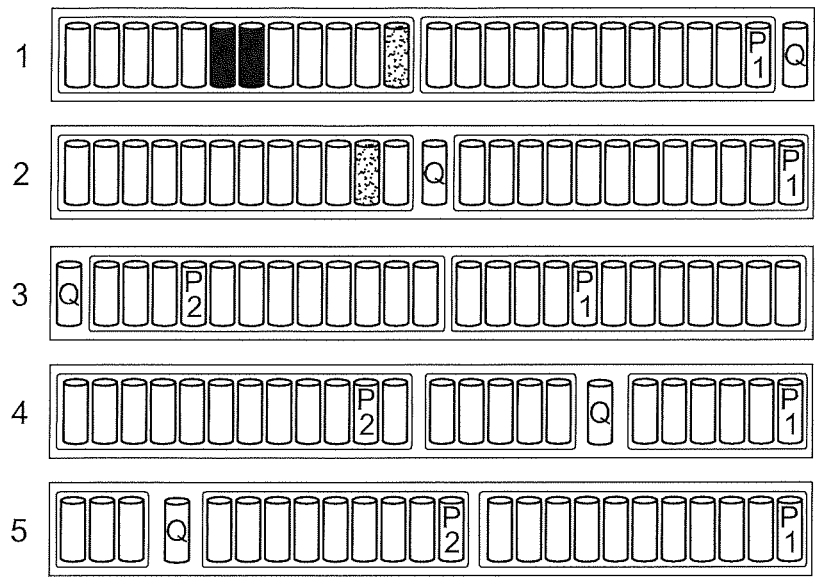
FIG. 7c is a schematic illustration showing the RAID row of FIG. 7b following a second disk failure in the first stripe on the left, according to some examples of the presently disclosed subject matter.

FIG. 7c is a schematic illustration showing the RAID row of FIG. 7b following a second disk failure in stripe 1, according to some examples of the presently disclosed subject matter. Following a second disk failure in stripe 1, the lost segment from the failed disk is reconstructed and written instead of the one parity segment P1 in stripe 2 and the other parity P2 in stripe 2 is recalculated over the entire stripe to thereby obtain a RAID 6-like protection in stripe 2. This is different than the common approach according to which the reconstructed segment would have been written to the other parity segment in stripe 1. Notably, in this example, at the time of the second disk failure, all four stripes 2 to 5 in the same row have three valid parity segments, which is the "greatest" number of parity segments. In this case stripe 2 was selected for writing the reconstructed data from stripe 1.

Figure 7D:
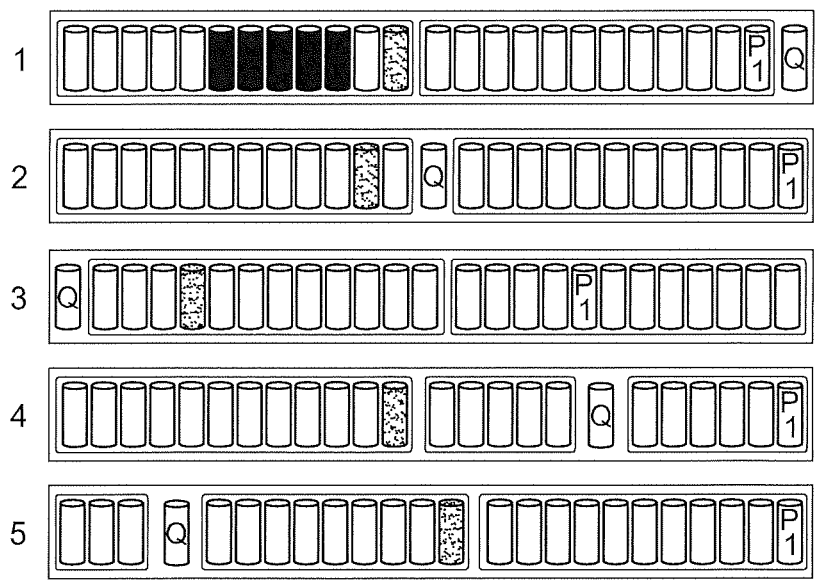
FIG. 7d is a schematic illustration showing the RAID row of FIG. 7b following five disk failures in the first stripe on the left, according to some examples of the presently disclosed subject matter.

FIG. 7d is a schematic illustration showing the RAID row of FIG. 7b following five disk failures in the first stripe on the left, according to some examples of the presently disclosed subject matter. As shown by the illustration, after each additional disk failure, the lost segment from the failed disk is reconstructed and written instead of one parity segment P1 of a different stripe in the same RAID row, and the other parity P2 of that stripe is recalculated over the entire stripe to thereby obtain a RAID 6-like protection in each stripe.

According to some examples, RAID controller 220 can be configured to update the RAID distribution table following each rebuild to indicate the location of the reconstructed segments (including data indicating in which stripe the reconstructed segments are stored). According to some examples, in case it is determined that all stripes in the same RAID row lost one parity segment and each stripe is now protected by one less parity segment (as illustrated in FIG. 7d), the process can be repeated, where for each disk failure a reconstructed segment is written to a parity segment at a different stripe in the same row. Given M stripes in a RAID row, following M additional failures in the row, which may occur in the same stripe or in more than one stripe, all stripes will be protected by a RAID 5-like protection scheme.

These principles can be likewise implemented with other RAID schemes. For example, a RAID 6 protection scheme, where following one disk failure, the lost segment from the failed disk is reconstructed and written instead of the Q parity segment in the same stripe, to thereby obtain a RAID 5-like protection. Any additional failure of a disk in the same RAID stripe is followed by the reconstruction of the lost segment from the failed disk, which is then written instead of the Q parity segment of a different stripe in the same RAID row, to thereby obtain a RAID 5-like protection.

Notably, the disclosed protection scheme can protect from at least M disk failures (M being the number of stripes in a RAID row). More specifically, where R is the number of parity segments, the disclosed protection scheme can allow up to (R−1)×M non-concurrent disk failures, which would ultimately result in RAID 5-like protection, providing protection from one additional disk failure in each stripe and a total of R×M disk failures.

It will also be understood that the system according to the presently disclosed subject matter may be a suitably programmed computer. Likewise, the presently disclosed subject matter contemplates a computer program being readable by a computer for executing the method of the presently disclosed subject matter. The presently disclosed subject matter further contemplates a computer-readable non-transitory memory tangibly embodying a program of instructions executable by the computer for performing the method of the presently disclosed subject matter. The term "non-transitory" is used herein to exclude transitory, propagating signals, but to otherwise include any volatile or non-volatile computer memory technology suitable to the application.

It is also to be understood that the presently disclosed subject matter is not limited in its application to the details set forth in the description contained herein or illustrated in the drawings. The presently disclosed subject matter is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the present presently disclosed subject matter.

The invention claimed is:

1. A computer implemented method of data protection using RAID; the method comprising:
    allocating N storage devices constituting a RAID pool; each storage device is dedicated for storing a plurality of segments, where a sequence of segments spanning across all N storage devices constitute a RAID row, each RAID row comprises M RAID stripes, where M>2;
    responsive to a need to write data in the storage system, using at least one processor for:
    generating one or more RAID rows, and for each RAID row:
    generating M RAID stripes, each RAID stripe comprising at least K segments, where K*M≤N, the at least K segments including a plurality of data segments and at least one parity segment; wherein a RAID protection scheme is applied on each one of the M RAID stripes independently from other RAID stripes in the RAID row;
    allocating each one of the K*M segments of the M RAID stripes to a respective storage device from among the N storage devices in the RAID pool, such that segments from different RAID stripes are mixed across the RAID row; and
    writing the K*M segments of the M RAID stripes to the respective storage devices as a single RAID row; wherein mixing of segments varies in different RAID rows, such that when data of two or more RAID rows is written, different combinations of segments from different stripes are written to different storage devices.

2. The computer implemented method of claim 1 further comprising implementing a randomized distribution scheme for randomly distributing the at least K segments of the M RAID stripes to respective storage devices from among the N storage devices.

3. The computer implemented method of claim 2 further comprising:

identifying the plurality of other storage devices storing other segments from the common stripe, based on a RAID distribution table used for mapping segments to respective storage devices.

4. The computer implemented method of claim 1 further comprising: responsive to a storage device failure, using at least one processor for executing a rebuild process comprising:

for each segment in a failed storage device:
reading data from a plurality of other storage devices storing other segments from a common stripe; wherein a total number of the plurality of other storage devices is greater than number of segments in the common stripe.

5. The computer implemented method of claim 4 further comprising reconstructing each segment based on the read data.

6. The computer implemented method of claim 1 further comprising, responsive to a need to write data to one or more RAID rows, for each row: dividing the data into M data groups, dividing each data group to segments and generating a respective RAID stripe from each data group.

7. The computer implemented method of claim 1, wherein each RAID stripe comprises more than one parity segment.

8. The computer implemented method of claim 1, wherein the K segments include at least one parity segment calculated using all data segments in the RAID stripe.

9. The computer implemented method of claim 1 further comprising:

responsive to detection of a failed storage device, using at least one processor for executing a rebuild process comprising:
for each segment in the failed storage device:
reading data from a plurality of other storage devices storing other segments from a common stripe;
reconstructing the segment based on the read data;
identifying a different stripe in the same RAID row which comprises a number of valid parity segments that is greater than the number of valid parity segments in the common stripe; and
writing the reconstructed segment to a parity segment in the different stripe.

10. The computer implemented method of claim 9, wherein the different stripe in the same RAID row is one that comprises a greatest number of valid parity segments of all stripes in the RAID row.

11. The computer implemented method of claim 9, wherein the data protection in the storage system is capable of handling up to R×M non-concurrent storage device failures in a single stripe without data loss, where R is the number of parity segments in each stripe.

12. A data storage system comprising:
an interface layer comprising at least one control unit comprising a processing circuitry and being operatively connected to a plurality of storage devices constituting a physical storage space; the interface layer is configured to allocate N storage devices constituting a RAID pool; each storage device is dedicated for storing a plurality of segments, where a sequence of segments spanning across all N storage devices constitute a RAID row, each RAID row comprises M RAID stripes, where M>2;
the at least one control unit is configured, responsive to a need to write data in the storage system, to:
generate one or more RAID rows, and for each RAID row:
generate M RAID stripes, each RAID stripe comprising at least K segments, where K*M≤N, the at least K segments including a plurality of data segments and at least one parity segment; wherein a RAID protection scheme is applied on each one of the M RAID stripes independently from other RAID stripes in the RAID row;
distribute each one of the K*M segments of the M RAID stripes to a respective storage device from among the N storage devices in the RAID pool, such that segments from different RAID stripes are mixed across the RAID row; and
write the K*M segments of the M RAID stripes to the respective storage devices as a single RAID row; wherein mixing of segments varies in different RAID rows, such that when data of two or more RAID rows is written, different combinations of segments from different stripes are written to different storage devices.

13. The data storage system of claim 12, wherein the at least one control device is further configured to implement a randomized distribution scheme for randomly distributing the M RAID stripes to a respective storage device from among the N storage devices.

14. The data storage system of claim 13, wherein the at least one control unit is further configured to identify the plurality of other storage devices storing other segments from the common stripe based on a RAID distribution table used for mapping segments to respective storage devices.

15. The data storage system of claim 12, wherein the at least one control unit is further configured, responsive to a storage device failure, to execute a rebuild process comprising:

for each segment in a failed storage device:
read data from a plurality of other storage devices storing other segments from a common stripe; wherein a total number of the plurality of other storage devices is greater than the number of segments in the common stripe.

16. The data storage system of claim 15, wherein the at least one control unit is further configured to reconstruct each segment based on the read data.

17. The data storage system of claim 12, wherein the at least one control unit is further configured, responsive to a need to write data to one or more RAID row, for each row to: divide the data into M data groups, divide the data in each data group to segments and generate a respective RAID stripe from each data group.

18. The data storage system of claim 12, wherein each RAID stripe comprises more than one parity segment.

19. The data storage system of claim 12, wherein the interface layer comprises a plurality of interconnected control units, which are given access to the N storage devices constituting the RAID pool, such that all storage devices in the RAID pool are exposed to all the interconnected control units, providing a uniform physical storage space over all disks in the pool.

20. The data storage system of claim 12, wherein the at least K segments include at least one parity segment calculated using all data segments in the RAID stripe.

21. The data storage system of claim 12 wherein the at least one control unit is configured, responsive to for each segment in the failed storage device:
read data from a plurality of other storage devices storing other segments from a common stripe;
reconstruct the segment based on the read data;

identify a different stripe in the same RAID row which comprises a greater number of valid parity segments than the number of valid parity segments in the common stripe; and write the reconstructed segment to a parity segment in the different stripe.

22. The data storage system of claim 21 wherein the identifying comprises identifying a different stripe in the same RAID row which comprises the greatest number of valid parity segments of all stripes in the RAID row.

23. The data storage system of claim 21, wherein the at least one control unit is configured to implement data protection for handling up to R×M non-concurrent storage device failures in a single stripe without data loss, where R is the number of parity segments in each stripe.

24. A non-transitory computer readable storage medium tangibly embodying a program of instructions that, when executed by a computer, cause the computer to execute a method of allocating N storage devices constituting a RAID pool; each storage device is dedicated for storing a plurality of segments, where a sequence of segments spanning across all N storage devices constitute a RAID row, each RAID row comprises M RAID stripes, where M>2;

the method comprising:
responsive to a need to write data:
generating one or more RAID rows, for each RAID row:
generating M RAID stripes, each RAID stripe comprising at least K segments, where K*M≤N, the at least K segments including a plurality of data segments and at least one parity segment; wherein a RAID protection scheme is applied on each one of the M RAID stripes independently from other RAID stripes in the RAID row;
distributing each one of the K*M segments of the M RAID stripes to a respective storage device from among the N storage devices in the RAID pool, such that segments from different RAID stripes are mixed across the RAID row and
writing the K*M segments of the M RAID stripes to the respective storage devices as a single RAID row; wherein mixing of segments varies in different RAID rows, such that when data of two or more RAID rows is written, different combinations of segments from different stripes are written to different storage devices.

25. The non-transitory computer readable storage medium of claim 24, wherein the method further comprises:
responsive to detection of a failed storage device, using at least one processor for executing a rebuild process comprising:
for each segment in the failed storage device:
reading data from a plurality of other storage devices storing other segments from a common stripe;
reconstructing the segment based on the read data;
identifying a different stripe in the same RAID row which comprises a number of valid parity segments that is greater than the number of valid parity segments in the common stripe; and
writing the reconstructed segment to a parity segment in the different stripe.

26. The non-transitory computer readable storage medium of claim 24, wherein the different stripe in the same RAID row is one that comprises a greatest number of valid parity segments of all stripes in the RAID row.

27. The non-transitory computer readable storage medium of claim 24, wherein the data protection in the storage system is capable of handling up to R×M non-concurrent storage device failures in a single stripe without data loss, where R is the number of parity segments in each stripe.

* * * * *